D. AUGUSTINE.
CRANKING DEVICE FOR AUTOMOBILE ENGINES.
APPLICATION FILED SEPT. 13, 1909.

976,536.

Patented Nov. 22, 1910.

Witnesses:
George Altsch
G. M. Cole

David Augustine.
Inventor.
By
Attorney.

UNITED STATES PATENT OFFICE.

DAVID AUGUSTINE, OF SOUTH BEND, INDIANA.

CRANKING DEVICE FOR AUTOMOBILE-ENGINES.

976,536.   Specification of Letters Patent.   Patented Nov. 22, 1910.

Application filed September 13, 1909. Serial No. 517,415.

*To all whom it may concern:*

Be it known that I, DAVID AUGUSTINE, a citizen of the United States, residing at South Bend, in the county of St. Joseph and State of Indiana, have invented certain new and useful Improvements in Cranking Devices for Automobile-Engines, of which the following is a specification.

This invention relates to a cranking device for automobile engines.

The main object of the invention is to provide a cranking device operable from the seat of the automobile or other vehicle, thus obviating the annoyance and inconvenience to the operator occasioned in getting out of the machine in order to crank the engine.

Another object resides in the provision of a comparatively simple, inexpensive, durable and efficient device operable from the seat of the vehicle to crank the engine for starting purposes.

With the above and other objects in view, the present invention consists in the combination and arrangement of parts hereinafter more fully described, illustrated in the accompanying drawings, and particularly pointed out in the appended claims, it being understood that changes may be made in the form, proportion, size and minor details without departing from the spirit or sacrificing any of the advantages of the invention.

Figure 1:
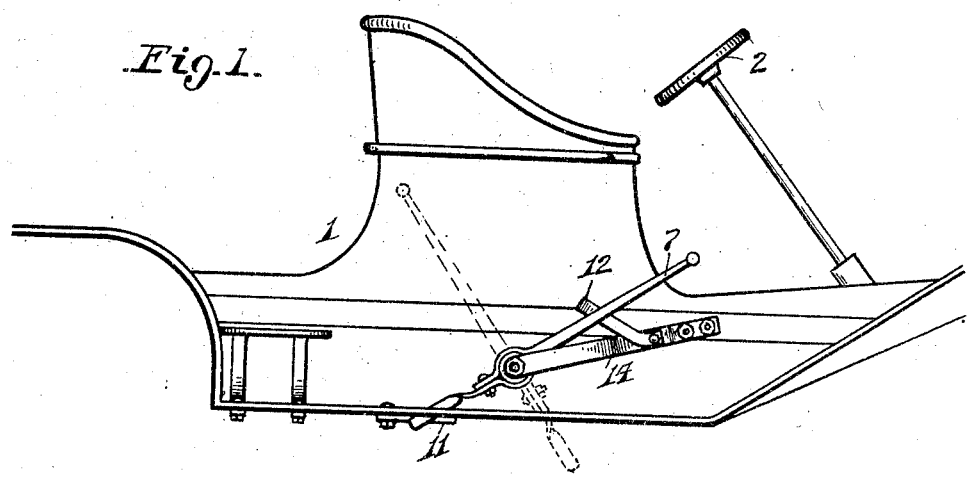
Figure 2:
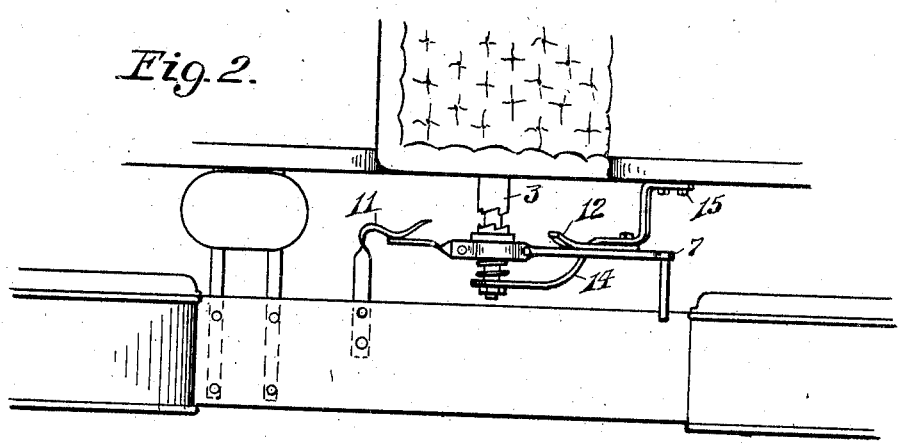
Figure 3:
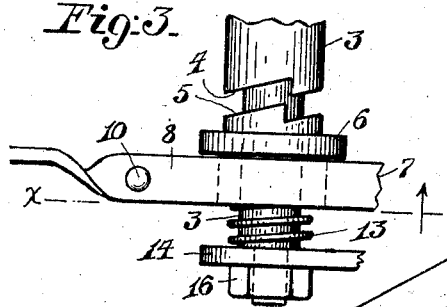
Figure 4:
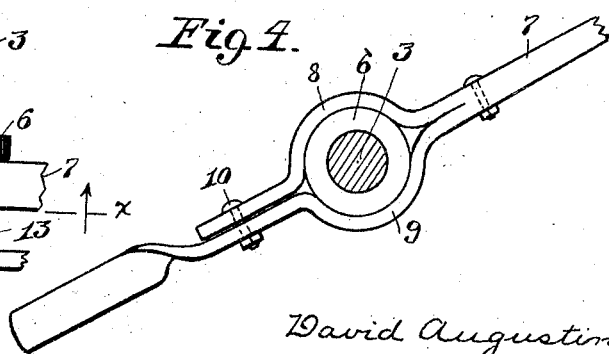

In the drawings:—Figure 1 is a side elevation of the body of an automobile illustrating my invention applied thereto. Fig. 2 is a top plan view of the invention applied to an automobile body. Fig. 3 is an enlarged detail plan view of the clutch mechanism. Fig. 4 is an enlarged side elevation of the cranking lever mounted upon one of the members of the clutch mechanism.

Referring now more particularly to the accompanying drawings, the reference character 1 indicates the body of an automobile or other vehicle provided with the usual steering wheel 2, there being journaled transversely of the body a crank shaft 3 which has operative connection with the engine, the crank shaft being reduced at one end to form a shoulder, which is notched to provide teeth forming a clutch face 4, with which latter coöperates the clutch face 5 of a sleeve 6, slidably mounted upon the reduced end of the shaft 3.

The character 7 indicates a crank lever whose arms 8 and 9 are in the form of straps adapted to embrace the sleeve 6 of the clutch mechanism, the arm 8 being preferably shorter than the arm 9, but in any event the two arms are held in frictional contact with the sleeve 6 by the adjusting bolt 10, whereby just sufficient frictional contact is permitted between the crank lever and the sleeve as to turn the crank shaft forward, upon a downward movement of the crank lever, but in the event of a "back fire," resulting in a reversal of the engine, which sometimes happens, and which causes many accidents and injury to persons and the machinery, the crank lever will strike an obstruction on the machine, hereinafter described, and the frictional contact between the crank lever and the sleeve, not being sufficient to overcome the power of the engine, the sleeve would turn with the crank shaft while the lever would remain stationary.

When the crank lever 7 is in the position shown in Figs. 1 and 2, the clutch face 5 is held out of contact with the clutch face 4 on the crank shaft by means of obstructions or stops 11 and 12, the former being secured in any suitable manner to the body 1 of the vehicle, and the latter being secured to the bracket 14. The stops 11 and 12 are preferably spring arms and adapted to yield so as to frictionally hold the crank lever in its forward position, the outer ends of said arms being curved outwardly so as to facilitate engagement therewith of the crank shaft. The lower stop 11 has operative engagement with the lower end of the arm 9 of the crank lever 7, while the upper stop 12 has engagement with the upper end of the crank lever, the contact between the lever and stops taking place as the lever reaches its extreme forward throw, always resulting in an automatic shifting of the sleeve 6 outwardly from the crank shaft at the end of each forward throw of the cranking lever. Just as soon as the crank lever is thrown backwardly and out of engagement with the stops, the clutch faces 4 and 5 clutch automatically by virtue of the spring 13 between the sleeve 6 and the aforesaid bracket 14 secured at 15 to the body of the vehicle and held upon the reduced end of the crank shaft 3 by means of a nut 16.

To crank the engine without the necessity of the operator leaving the seat of the vehicle, the operator has simply to work the crank lever 7 back and forth in order to crank the engine, the clutch mechanism being thrown into and out of operation automatically.

The device is illustrated only in connection with a machine that cranks from the side, but it is obvious that the same may also be applied to machines that crank in front, by adding a connection operable from the seat, the automatic throwing in and out of the clutch mechanism rendering this possible. It is deemed unnecessary to illustrate the application of the device to vehicles that crank in front rather than on the side, as in the present instance.

What is claimed is:—

1. In a cranking device, a vehicle body, a crank shaft, a clutch mechanism on the crank shaft, a bracket having connection with the vehicle body and the crank shaft, a spring stop secured to the body, a second spring stop secured to said bracket, a crank lever having operative engagement with the clutch mechanism, both of said stops being disposed in the path of movement of the crank lever to effect an automatic release of the clutch mechanism when the crank lever is brought into contact with the said stops, and a spring interposed between the bracket and the clutch mechanism to throw the latter into operation when the crank lever is out of contact with said stops.

2. In a cranking device, a vehicle body, a crank shaft, a clutch mechanism on the crank shaft, a bracket having connection with the vehicle body and the crank shaft, a spring stop secured to the body, a second spring stop secured to said bracket, a crank lever having operative engagement with the clutch mechanism, both of said stops being disposed in the path of movement of the crank lever to effect an automatic release of the clutch mechanism when the crank lever is brought into contact with the said stops, and means constructed and arranged to throw the clutch mechanism into operation when the crank lever is out of contact with said stops.

3. In a cranking device, a vehicle body, a crank shaft, a clutch mechanism on the crank shaft, a bracket having connection with the vehicle body and the crank shaft, a stop secured to the body, a second stop secured to said bracket, a crank lever having operative engagement with the clutch mechanism, and both of said stops being disposed in the path of movement of the crank lever to effect an automatic release of the clutch mechanism when the crank lever is brought into contact with the stops, and a spring interposed between the bracket and the clutch mechanism to throw the clutch mechanism into operation when the crank lever is out of contact with said stops.

4. In a cranking device, a vehicle body, a crank shaft reduced at one end and shouldered and notched to provide a clutch face, a sleeve slidably mounted on the reduced end of the crank shaft and provided with a clutch face for coöperation with the aforesaid clutch face, a crank lever having operative engagement with said sleeve, and means coöperating with the crank lever to effect an automatic separation of the clutch faces.

5. In a cranking device, a vehicle body, a crank shaft reduced at one end and shouldered and notched to provide a clutch face, a sleeve slidably mounted on the reduced end of the crank shaft and provided with a clutch face for coöperation with the aforesaid clutch face, a crank lever having operative engagement with said sleeve, stops disposed in the path of movement of the crank lever to effect a separation of the clutch faces when the lever is brought into engagement with said stops, and a spring having engagement with said sleeve to effect an automatic operative connection between the clutch faces when the crank lever is out of engagement with said stops.

6. In a cranking device, a vehicle body, a crank shaft, a clutch mechanism on the crank shaft, a bracket having connection with the vehicle body and the crank shaft, a stop secured to the body, a second stop secured to said bracket, a crank lever having operative engagement with the clutch mechanism, and both of said stops being disposed in the path of movement of the crank lever to effect an automatic release of the clutch mechanism when the crank lever is brought into contact with the stops, and means constructed and arranged to throw the clutch mechanism into operation when the crank lever is out of contact with said stops.

7. In a cranking device for automobiles or other vehicles, a crank shaft, a clutch mechanism on the crank shaft, a crank lever having operative engagement with the clutch mechanism, and stops disposed in the path of movement of the crank lever to engage opposite ends thereof and effect an automatic release of the clutch mechanism when the crank lever is brought into contact with said stops.

8. In a cranking device for automobiles or other vehicles, a crank shaft, a clutch mechanism on the crank shaft, a crank lever having operative engagement with the clutch mechanism, and stops disposed in the path of movement of the crank lever for frictional engagement with opposite ends of the latter to effect an automatic release of the clutch mechanism when the crank lever is brought into contact with the stops.

9. In a cranking device for automobiles or other vehicles, a vehicle body, a crank shaft, a clutch mechanism on the crank shaft including a slidable sleeve, a crank lever having connection with said slidable sleeve, to shift the latter and also to move independently thereof when the clutch mechanism is in operative condition, and stops disposed in the path of movement of the crank lever to effect an automatic release of the clutch mechanism.

In testimony whereof I affix my signature, in presence of two witnesses.

DAVID AUGUSTINE.

Witnesses:
　GEORGE OLTSCH,
　G. M. COLE.